United States Patent [19]

Weil et al.

[11] Patent Number: 5,475,041
[45] Date of Patent: Dec. 12, 1995

US005475041A

[54] FLAME RETARDANT POLYOLEFIN WIRE AND CABLE INSULATION

[75] Inventors: Edward D. Weil, Westchester; Weiming Zhu, Queens, both of N.Y.

[73] Assignee: Polytechnic University, Brooklyn, N.Y.

[21] Appl. No.: 135,119

[22] Filed: Oct. 12, 1993

[51] Int. Cl.[6] .......................... C08K 5/3492; C08K 3/00
[52] U.S. Cl. ............................... 524/100; 524/447
[58] Field of Search ......................... 524/100, 447

[56] References Cited

U.S. PATENT DOCUMENTS

| | | | |
|---|---|---|---|
| 2,603,614 | 7/1952 | Nielsen et al. | 260/30.6 |
| 3,368,976 | 2/1968 | Conley et al. | 252/63.5 |
| 4,072,643 | 2/1978 | Bost | 260/23 H |
| 4,154,930 | 5/1979 | Halpern | 524/100 |
| 4,172,826 | 10/1979 | Haaf | 525/96 |
| 4,183,875 | 1/1980 | Eckelt et al. | 524/100 |
| 4,198,492 | 4/1980 | Izawa et al. | 524/100 |
| 4,201,705 | 5/1980 | Halpern et al. | 524/100 |
| 4,672,086 | 6/1987 | Selle et al. | 524/127 |
| 4,866,114 | 9/1989 | Taubitz et al. | 524/100 |
| 4,888,370 | 12/1989 | Freitag et al. | 524/100 |
| 4,966,931 | 10/1990 | Akitaya et al. | 524/100 |
| 5,077,328 | 12/1991 | Haruna et al. | 524/100 |
| 5,104,735 | 4/1992 | Cioffi et al. | 428/383 |
| 5,130,357 | 7/1992 | Akitaya et al. | 524/100 |
| 5,164,435 | 11/1992 | Abe et al. | 524/100 |

FOREIGN PATENT DOCUMENTS

| | | |
|---|---|---|
| 1253283 | 4/1989 | Canada . |
| 1058794 | of 1992 | China . |
| 239199 | of 1987 | Czechoslovakia . |
| 61-264034 | of 1986 | Japan . |
| 1139642 | of 1989 | Japan . |

OTHER PUBLICATIONS

Kay, M. et al., "A Review of Intumescent Materials, with Emphasis on Melamine Formulations", *Journal of Fire Retardant Chemistry*, vol. 6 (Mar. 1979), pp. 69–91.

Khalturinskii, N. A. et al., "On Reduction of Combustibility of Polymeric Materials", *International J. Polymeric Materials*, 1990, vol. 14, pp. 109–125.

Washabaugh, Frank J. "Performance of Surface Modified Kaolins in EPDM Rubbers", *Rubber World*, Oct., 1987, 6 pages.

*Primary Examiner*—Kriellion S. Morgan
*Attorney, Agent, or Firm*—Fish & Richardson

[57] ABSTRACT

A flame retardant composition is provided comprising a normally flammable polyolefin or olefin copolymer, and a flame retardant amount of melamine or salt thereof, a polyphenylene oxide and a silicaceous material.

10 Claims, No Drawings

FLAME RETARDANT POLYOLEFIN WIRE AND CABLE INSULATION

BACKGROUND OF THE INVENTION

Wire and cable insulation are normally quite flammable, unless they are made from costly inherently flame retardant materials. As a result, they can poses a fire propagation hazard in power plants, distribution areas, manholes, and buildings. Ignition can easily occur from overheating or arcing. Non-halogenated wire and cable insulation typically consist of polyolefins (polyethylene, polypropylene and/or copolymers thereof) or copolymers of olefins with vinyl monomers, such as vinyl acetate or ethyl acrylate. These polymers have the burning characteristics of saturated hydrocarbons with high heats of combustion and a tendency to burn completely, without forming char. The polyolefins and olefin copolymers, absent the inclusion of halogen additives, are especially difficult to flame-retard.

Presently, flame-retarding of wire and cable insulation is accomplished in three principal ways. One approach is to use halogenated additives: for example, chlorinated polymers such as chlorosulfonated polyethylene, neoprene, polyvinyl chloride, or the like. Halogen-containing additives also can be used, such as decabromodiphenyl oxide, sold under the trademark Dechlorane Plus™, tetrabromophthalimides, chlorowaxes, or the like. Frequently, these halogenated polymers or additives are boosted or "synergized" in their flame retardant activity by adding antimony oxide. The inherent shortcoming of using halogenated materials and halogen containing additives is that the gases evolved (i.e. hydrogen chloride or hydrogen bromide) during burning, or even merely overheating, are corrosive as well as being highly irritating to the eyes and respiratory system.

A more recent basis of concern regarding halogenated flame retardants is that they may pose an environmental hazard, because they can persistent in the environment and are capable of combustion or pyrolysis under certain conditions to form toxic compounds, such as polyhalodibenzodioxins or polyhalodibenzofurans. Whether or not they constitute an actual hazard, the use of halogenated materials has raised environmental concerns and they are now the subject of increasing regulatory attention.

A second approach to providing flame retardancy for wire and cable insulation, especially those made of polyolefins and olefin copolymers, is to use a hydrated mineral such as alumina trihydrate or magnesium hydroxide. By using high loadings, such minerals provide an endothermic water release under heating and burning conditions that effects a flame retardant action. The drawback of these systems is the need for high loadings, which render the insulation undesirably stiff and abrasive.

There are processing difficulties in manufacturing highly loaded hydrated mineral polymer systems as well. Some improvement can be achieved with coupling agents, such as silanes and silicones, but at substantial cost. Furthermore, these hydrated minerals are polar in character and exert quite adverse effects on the electrical resistance and dielectric characteristics of the insulation. Cable insulation containing hydrated minerals are only marginally useful for voltages above about 2–3 kV, and are generally unsatisfactory for use as primary insulation.

A third approach employs phosphorus compounds, as well as char-forming and intumescent additives. Typical formulations frequently applied to the flame-retarding of polyolefins and olefin copolymers use ammonium polyphosphate as the char-forming catalysts and a resin, such as dipentaerythritol resin, ethyleneurea-formaldehyde resin or triazinepiperazine resin as the source of the char. Such systems are expensive and have several electrical resistance and dielectric shortcomings. They can also not be used in high voltage or primary insulation applications. Ammonium polyphosphate component is hydrolyzable and forms electrically conductive water-soluble ammonium phosphate. The use of aryl or alkyl phosphate esters causes exudation and, as a result, they are relatively inefficient flame retardants in polyolefins.

In view of the short-comings of the commonly used approaches, there is a need for flame retardant systems for normally flammable insulation, in particular polyolefins and olefin copolymers, that does not cause corrosive or toxic gas emissions, or unduly stiffen or otherwise adversely affect the physical properties of the insulation, and which permits retention of good electrical properties.

The use of polyphenylene oxides in miscible blends with styrenic polymers is well known in the art. Due to their compatible solubility parameters, polyphenylene oxides even form true alloys with, for example, high impact polystyrenes. Such polyphenylene oxide-styrenic polymer blends have been flame retarded by many means, including the use of various phosphorus additives. Melamine has been used in some of these flame retardant systems.

It appears that blends of polyphenylene oxides (ethers) with polyolefins have not been widely used because, unlike styrenic copolymers, polyolefins do not form true polymer solutions with polyphenylene oxides. The use of polyphenylene oxides in polyolefins is disclosed by Abolins et al. in Canadian Patent No. 1 253 283. To achieve flame retardancy, Abolins et al. discloses the addition of at least an organic phosphate ester as a requirement and optionally a halogenated additive to the resin. The use of melamine and/or an effective amount of a silicaceous mineral as part of the flame retardant system is absent.

It is an object of the present invention to provide flame retardant blends for polyolefins and olefin copolymers.

It is a further object to provide flame retardant insulation formulations that produce little or no corrosive smoke.

SUMMARY OF THE INVENTION

The invention is directed to novel flame-retardant blends comprising normally flammable polyolefin or olefin copolymers with a flame retardant additive composition. By the term "normally flammable," it is meant that the material will continue to burn once ignited. In particular, the flame retardant compositions comprise an effective flame retarding amount of a synergistic combination of three flame retardant compounds, namely melamine or salts thereof, a polyphenylene oxide and a substantially anhydrous silicaceous mineral. The invention may be used to form wire and cable insulation, i.e., the primary insulation and/or cable jacketing.

DETAILED DESCRIPTION OF THE INVENTION

The invention comprises flame-retardant blends which are flame retardant to various useful degrees as assessed by the criteria and standards of the wire and cable insulation field. Such criteria ranges are determined using small scale tests, such as the oxygen index test, the Underwriters Laboratory 94 (UL94) test, the Underwriters Laboratory VW-1 test and using large scale cable tray tests, such as the IEEE 383. These are standard methods that are well known in the art:

for example, as set forth in Undewriters Laboratories Inc., *Tests For Flammability of Plastic Materials* (1988), which is incorporated by reference herein. More recently, the rate-of-heat-release calorimetry tests have been used; for example, the "cone calorimeter" developed at NIST. It is generally recognized that insulation materials having oxygen indices above about 27, preferably above about 30, can be expected to pass the larger scale tests, which are influenced by the construction, weight of the conductor, closeness of packing, and other geometric factors aside from the character of the insulation material. It will be recognized by those skilled in the art of insulation compounding that there is a plethora of such standards and test methods, and that the amount of the additives used to flame retard a given wire or cable insulation will depend on many factors, including the severity of the test to be applied, construction, choice of base-polymer, weight of the conductor, aging and weathering criteria, and the like.

Hereinafter in the present discussion, the oxygen index test and the Underwriters Laboratory UL 94 test (bottom ignition of a vertically held sample) are used to establish meaningful criteria of flame retardancy suitable for laboratory utilization and demonstration. It should be understood that other standard tests can also be used.

The preferred blends of the present invention have oxygen indices above 30. The blends will provide superior flame retardancy when used to make wire and cable insulation. In addition, the flame retardant blends will provide advantageous resistance to the ingress of water.

As defined hereinafter, the normally flammable polymers used in the flame retardant blend of the present invention include, but are not limited to, thermoplastic or crosslinked polyolefin polymers including polyethylene, polypropylene, ethylene-higher olefin copolymers, ethylene vinyl acetate copolymers, ethylene vinyl silane copolymers and moisture-cured products thereof, ethylene-propylene copolymers, ethylene-propylene-diene modified terpolymers (EPDM) (in particular, ethylene-propylene-hexadiene) and crosslinked products thereof, polybutadienes, polyisoprenes, styrenebutadiene copolymers, and polyisobutylenes, as well as olefin copolymers where the olefin comprises the major monomer; examples being ethylene vinyl acetate copolymer and ethylene lower alkyl ($C_1$ to $C_5$) acrylate or methacrylate copylymers. It is preferred that the above polymers be non-halogenated.

The melamine component of the invention preferably comprises melamine itself, 2,4,6-triamino-1,3,5-triazine, a readily available article of commerce. Less preferred are the highly disassociated salts of melamine; for example, melamine cyanurate and melamine phosphate. Combinations of melamine and its salts may also be used. The term melamine phosphate encompasses the pyrophosphate as well as the orthophosphates. These salts are somewhat less active than melamine and may also cause some loss of electrical properties, such as power factor or resistivity.

The polyphenylene oxide (also known as polyphenylene ether) (PPO) component in the blends of the present invention may be resins such as those described in U.S. Pat. Nos. 3,306,874, 3,306,875, 3,257,357 and 3,257,358, which are incorporated by reference herein. The preferred polyphenylene oxide used in the present invention comprises a plurality of structural units having the formula:

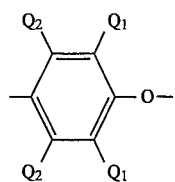

In each of said units, independently, $Q_1$ is primary or secondary lower alkyl of 1 to 6 carbon atoms or phenyl groups, and $Q_2$ is selected from hydrogen and primary or secondary lower alkyl of 1 to 6 carbon atoms and phenyl groups. Both homopolymer and copolymer of polyphenylene oxide may be used in the present additive composition. Homopolymers of polyphenylene oxide comprising 2,6-dimethyl-1,4-phenylene oxide units are preferred. Suitable copolymers include random copolymers containing 2,6-dimethyl-1,4-polyphenylene oxide units in combination with 2,3,6-trimethyl-1,4-phenylene oxide units. Other random copolymers, as well as homopolymers, are known in the polymer art and may be used in accordance with the present invention. The preferred form of the polyphenylene oxide is a fine powder.

The polyphenylene oxides, as a class of compounds, typically are characterized by a number average molecular weight of above about 3000, a weight average molecular weight of above about 20,000, and intrinsic viscosity typically in the range of about 0.1–0.6 dl./g., as measured in chloroform at 25° C., but these are not critical limits for purposes of the invention.

The present invention also encompasses polyphenylene oxides containing moieties (modifiers) which favorably modify properties, such as miscibility and blendability, with the base polymer of the insulation composition or the bonding of the base polymer to the other components, such as kaolinite or melamine. Various types of such modifiers are well known and may be grafted onto the polyphenylene oxide in known manner. Such modifiers include, but are not limited to, vinyl monomers such as ethylene, alpha-olefins, butadiene, acrylonitrile and styrene. Other suitable modifiers are coupled polyphenylene oxides in which the coupling agent is reacted in known manner with the terminal hydroxy groups of polyphenylene oxide chains to produce a modified polymer containing the reaction product of the hydroxy groups and the coupling agent. As use in this context, examples of coupling agents are quinones, maleic anhydride and acetals. Better blendability and more uniform properties, including more uniform (stronger and more protective) char, can be obtained when polyphenylene oxide is modified by grafting or otherwise coupling it with a hydrocarbon chain having a good solubility match with the base polymer matrix.

The polyphenylene oxides are typically prepared by the oxidative coupling of at least one corresponding monohydroxyaromatic compound. Particularly useful and readily available monohydroxyaromatic compounds are 2,6-xylenol (wherein each $Q_1$ is methyl group and each $Q_2$ is hydrogen), whereupon the polymer may be characterized as a poly(2,6-dimethyl-1,4-phenylene ether), and 2,3,6-trimethylphenol (where each $Q_1$ and one $Q_2$ is methyl group and the other $Q_2$ is hydrogen).

The flame retardant blends of the present invention also include a silicaceous mineral. The preferred silica-based minerals are fused silica, calcined kaolinite, talc, mica and aluminosilicate minerals, including various clays (montmorillonites, bentonites, attapulgites, and others). In making cable jackets, any of the above powdered silicaceous minerals may be used. However, when the flame-retardant blend is to be used in making a primary insulation for power cable, only substantially amorphous and anhydrous silica-based minerals are suitable due to their advantageous electrical properties; preferably calcined kaolinite and fused silica. The silicaceous minerals not only act as an inorganic filler, but are essential to the flame retardant result.

The quantities of the additives to be used in the flame retardant compositions are in the range of about 5 to 150 phr (parts per hundred by weight of the base polyolefin polymer or olefin copolymer) of the melamine or its salts, about 5 to 100 phr of the polyphenylene oxide and about 5 to 150 phr of the silicaceous mineral. The preferred ranges are about 25 to 100 phr of the melamine, about 15 to 60 phr of the polyphenylene oxide and about 15 to 100 phr of the silicaceous mineral in the flame retardant blends.

In the compositions, with regard to their flame retarding properties, reducing the amount of one additive can be compensated for by raising the amount of one or both of the other additives. For each base polymer, the optimum composition can be found empirically within the stated range of compositions. The total quantity of additive will depend on the flame retardancy standard and physical properties desired, as would be obvious to one skilled in the art. Higher quantities of the flame-retardant composition will (preferred minima as stated) typically be used when the UL 94 V0 standard, or its equivalent amongst wire and cable standards is to be met, but lower amounts will typically suffice to meet lower standards, such as self extinguishing in a horizontal position, as exemplified by a UL 94 HB SE standard.

The mixing may be performed by any of the several polymer mixing methods known to the art, such as kneading, processing in an extruder or in a two-roll mill. The thermoplastic mixture is then preferably cured to give it the desirable elastomeric and heat resistant properties required for wire and cable insulation. This curing is performed either by adding suitable peroxide, such as dicumyl peroxide, and by heating or by irradiation. Other curing methods may be used, such as the inclusion of a small amount of a trialkoxysilane either in the original copolymer as a comonomer or by grafting using a peroxide initiator in the known manner to form a vinyl trialkoxysilane graft on the thermoplastic polymer. If trialkoxysilane is used, the curing may be accomplished by exposing the formulation to moisture, such as steam or hot water.

Other ingredients may be included, such as carbon black, titanium dioxide, zinc oxide, red lead, plasticizers (including phosphate plasticizers) and extender oils. In addition, stabilizers such as hindered phenol antioxidants, arylamine antioxidants and antiozonants, and stabilizer synergists, such as sulfides, phosphites, phosphonites and the like, can be used. Components used in wire and cable insulation to aid moisture resistance and improve electricals include red lead, stearates, paraffin waxes and the like. Processing aids such as soaps, fluorocarbons, and silicones can be added.

The flame retardant blends can include a type modifier comprises compatibilizers, such as maleic anhydride adducts of polyolefins, including the maleic anhydride adduct of EPDM. Other compatibilizers include block copolymers of styrene and ethylene, propylene or butylene (available from Shell under the trademark KRATON™) and ethylene vinyl acetate copolymer, ethylene acrylate copolymers, used from additive quantities of about 2 phr up to 100 phr by weight of the base polymer.

Other means for achieving compatibilization of the PPO and the matrix polymer may be used as well. For example, extending the thermoplastic mixing time and/or temperature can result in thermomechanical generation of radicals and thus formation of grafts. Inclusion of peroxides or other radical generators such as dicumyl peroxide during this mixing can also favor graft formation, and, in turn, favor compatibilization. An alternative method of generating grafts is to include catalytic quantities of Friedel Crafts catalysts which cause the reaction of double bonds of EPDM with the phenylene rings of PPO. A suitable Friedel Crafts catalyst is montmorillonite having an acid surface, or active alumina.

To illustrate the invention, and to present the best mode of practicing the invention, the following examples are given, but are not intended to limit the scope of the invention.

In the following examples, the flame retardant blends were mixed in a Brabender Plasticorder at about 115° C. for about 10 minutes.

EXAMPLE 1

The following materials were mixed: ethylene-propylene-hexadiene copolymer (avaliable from Dupont under the trademark NORDEL™ 2722)-100 parts by weight; silane-treated calcined kaolin (sold under the trademark TRANS-LINK 37)-60 parts by weight; melamine (superfine powder) 100 parts by weight; poly(2,6-dimethyl-1,4-phenylene oxide) (sold under the trademark Blendex™ HPP821)-30 parts by weight; dicumyl peroxide (sold under the trademark PERKADOX™ BC, available from Akzo)-3 parts by weight.

The resulting mixture was a smooth-appearing flexible elastomer. It was cured by heating in a Carver press at 180° C. for about 20 minutes. The sheet was cut into test bars. The flammability was determined by the limiting oxygen index (LOI) method (ASTM D-2863) and by the Underwriters Laboratory 94 (UL94) test. The LOI was 33.7, well into the flame retardant range, and the UL 94 rating at ⅛" thickness was V0, also a high degree of flame resistance.

The test results for Example 1 and further Examples 2–18 using EPDM as the base polymer and the above additive ingredients are summarized in the following Table 1. Five comparison tests were conducted wherein one of the three additives was omitted Examples 8, 9, 10, 11 and 16. These examples illustrate the synergism of the three additives in that the omission of any one of the three essential additives of the flame retardant composition of the invention gives inferior results.

TABLE 1

| Example No. | EDPM (part) | TRANS-LINK™ 37 kaolinite (part) | melamine (part) | PPO (part) | LOI found (%) | UL 94 rating at ⅛" |
|---|---|---|---|---|---|---|
| 1 | 100 | 60 | 100 | 30 | 33.7 | V0 |
| 2 | 100 | 60 | 50 | 60 | 32.7 | V0 |
| 3 | 100 | 60 | 100 | 20 | 32.2 | V0 |
| 4 | 100 | 60 | 100 | 60 | 35.0 | V0 |
| 5 | 100 | 60 | 80 | 40 | 33.4 | V0 |
| 6 | 100 | 40 | 100 | 60 | 34.0 | V0 |
| 7 | 100 | 60 | 60 | 40 | 32.4 | V1 |
| 8 (com par.) | 100 | 0 | 100 | 60 | 25.7 | burned |
| 9 | 100 | 60 | 0 | 20 | 20.4 | burned |

TABLE 1-continued

| Example No. | EDPM (part) | TRANS-LINK™ 37 kaolinite (part) | melamine (part) | PPO (part) | LOI found (%) | UL 94 rating at 1/8" |
|---|---|---|---|---|---|---|
| 10 (com par.) | 100 | 60 | 100 | 0 | 25.9 | burned |
| 11 (com par.) | 100 | 0 | 100 | 60 | 25.7 | burned |
| 12 (less pref.) | 100 | 5 | 100 | 60 | 25.8 | SE |
| 13 (less pref.) | 100 | 20 | 100 | 60 | 29.3 | SE |
| 14 (com par.) | 100 | 60 | 100 | 0 | 25.9 | burned |
| 15 (less pref.) | 100 | 60 | 100 | 5 | 26.8 | SE |
| 16 (com par.) | 100 | 60 | 0 | 60 | 25.8 | burned |
| 17 (less pref.) | 100 | 60 | 10 | 60 | 29.2 | SE |
| 18 (less pref.) | 100 | 60 | 30 | 60 | 30.3 | SE | compar. = comparison experiment, not a composition of the invention.
less pref. = less preferred but within the broad scope of the invention
SE = self-extinguishing in UL94 horizontal burning.

EXAMPLE 19

Flame Retardant Ethylene Vinyl Acetate Copolymer Formulation

In a test similar to Example 1 above, a formulation was prepared in which ethylene vinyl acetate copolymer (sold by DuPont under the trademark ELVAX™ 460) was substituted for the EPDM. The resultant formulation after curing was found to have an oxygen index of 35.0 and a UL 94 rating of V0.

EXAMPLE 20

Flame Retardant Polyethylene

In a test similar to Example 1 above, a formulation was prepared in which polyethylene (sold by Quantum under the trademark PETROTHENE™ NA-951) was substituted for the EPDM. The resultant formulation after curing was found to have an oxygen index of 32.4 and a UL 94 rating of V0.

EXAMPLE 21

Comparison Formulation Using PPS Instead of PPO

In a test similar to Example 5 above, a formulation was prepared in which polyphenylene sulfide (sold by Phillips under the trademark RYTON™) was substituted for PPO. The LOI was 25.7 but the formulation burned completely in the UL 94 vertical test.

EXAMPLE 22

Comparison Formulation Using a Poly (2-Imidazolidone-Formaldehyde) Resin

In a test similar to Example 5 above, a comparison formulation was prepared using poly(2-imidazolidone-formaldehyde) (sold under the trademark SPINFLAM™ NF- 80, a commercial char-forming resin ingredient) substituted for the PPO. The LOI was 24.5 and the formulation burned completely in the UL 94 vertical test.

EXAMPLE 23

Comparison Formulation Using a Poly(Triazinylpiperazine) Resin

In a test similar to Example 5 above, a commercial char-forming resin, sold under the trademark SPINFLAM™ NF-82, believed to be primarily triezinepiperazine condensation polymer, was substituted for the PPO. The LOI was 23.8 and the formulation burned completely in the UL 94 vertical test.

EXAMPLE 24

Comparison Formulation Using Dipentaerythritol

In a test similar to Example 5 above, dipentaerythritol, a polyol resin commonly used as a char former in intumescent flame retardant formulations, was substituted for the PPO. The LOI was 22.8 and the formulation burned completely in the UL 94 vertical test.

EXAMPLE 25

Alternative Formulation Using a Different Calcined Clay

In a test similar to Example 3 above, sold under the trademark BURGESS™ KE, a calcined kaolin from Burgess Pigment Co., was used instead of TRANSLINK™ 37. The LOI was 32.3 and the sample was V0 in the UL 94 test.

EXAMPLE 26

Less Preferred Alternative Formulation Using an Amorphous Silica in Place of Translink 37.

In a test similar to Example 3 above, finely divided fused silica, sold under the trademark SILTEX™ 22 (available from Kaopolite, Inc.) was used in place of TRANLINK™ 37. The LOI was 31.4, but the formulation burned completely in the UL 94 vertical test. The sample is rated SE in the horizontal UL 94 test.

EXAMPLE 27

Less Preferred Alternative Formulation Using Melamine Cyanurate

In a test similar to Example 4 above, 50 phr of melamine and 50 phr of melamine cyanurate (sold under the trademark PLASTISAN™ B, a product of 3V Chemical Corp.) in place of the 100 phr of melamine. The LOI was found to be 33.7 and the sample was rated V0 in the UL94 vertical test at 1/8" thickness.

EXAMPLE 28

Less Preferred Alternative Formulation Using Melamine Pyrophosphate

In a test similar to Example 3 above, 100 phr of melamine pyrophosphate (sold under the trademark AEROGUARD™ MPP, a product of American Cyanamid Co.) was used in place of melamine. The LOI was found to be 27.0 and the sample was rated V0 in the UL94 vertical test at ⅛" thickness.

The foregoing is considered illustrative only of the principles of the invention. It is not desired to limit the invention to the exact principles described above. Accordingly, all suitable modifications and equivalents will fall within the scope of the invention.

What is claimed is:

1. A flame-retardant blend comprising a base polymer of a normally flammable polyolefin or olefin copolymer and a flame retardant additive composition, said composition comprising 50 to 150 phr of melamine or salts thereof, 5 to 100 phr of a polyphenylene oxide, and 50 to 150 phr of kaolin.

2. The composition according to claim 1 wherein said melamine salt is melamine cyanurate or melamine phosphate.

3. A flame-retardant blend according to claim 1 wherein said polymer comprises a non-halogenated polyolefin.

4. A flame-retardant blend according to claim 1 wherein said copolymer is a crosslinked ethylene-propylene-diene modified terpolymer.

5. A flame-retardant blend according to claim 1 wherein said copolymer is a crosslinked ethylenevinyl acetate copolymer.

6. A flame-retardant blend according to claim 1 wherein said polyolefin is a crosslinked polyethylene.

7. The composition according to claim 1 wherein said polyphenylene oxide is a homopolymer of poly(2,6-dimethyl-1,4-phenylene oxide).

8. A flame retardant cable primary insulation comprising a blend of a base polymer of a normally-flammable polyolefin or olefin copolymer and an additive composition of about 5 to 150 phr of melamine, about 5 to 100 phr of a polyphenylene oxide and about 5 to 150 phr of kaolin.

9. A flame retardant cable primary insulation according to claim 8 wherein said blend comprises about 25 to 100 phr of said melamine, about 15 to 60 phr of said polyphenylene oxide and about 15 to 100 phr of said kaolin.

10. A process for rendering a base polymer made of a polyolefin or olefin copolymer so as to be flame resistant comprising the steps of:

(a) mixing said polyolefin or olefin copolymers with a flame retardant additive composition, said composition comprising about 5 to 150 phr of melamine, about 5 to 100 phr of polyphenylene oxide and about 5 to 150 phr of kaolin; and (b) curing said blend by heating or irradiation.

* * * * *